April 18, 1950    J. M. JACOBSON ET AL    2,504,128
AIRCRAFT LANDING GEAR
Filed July 8, 1948    4 Sheets-Sheet 1
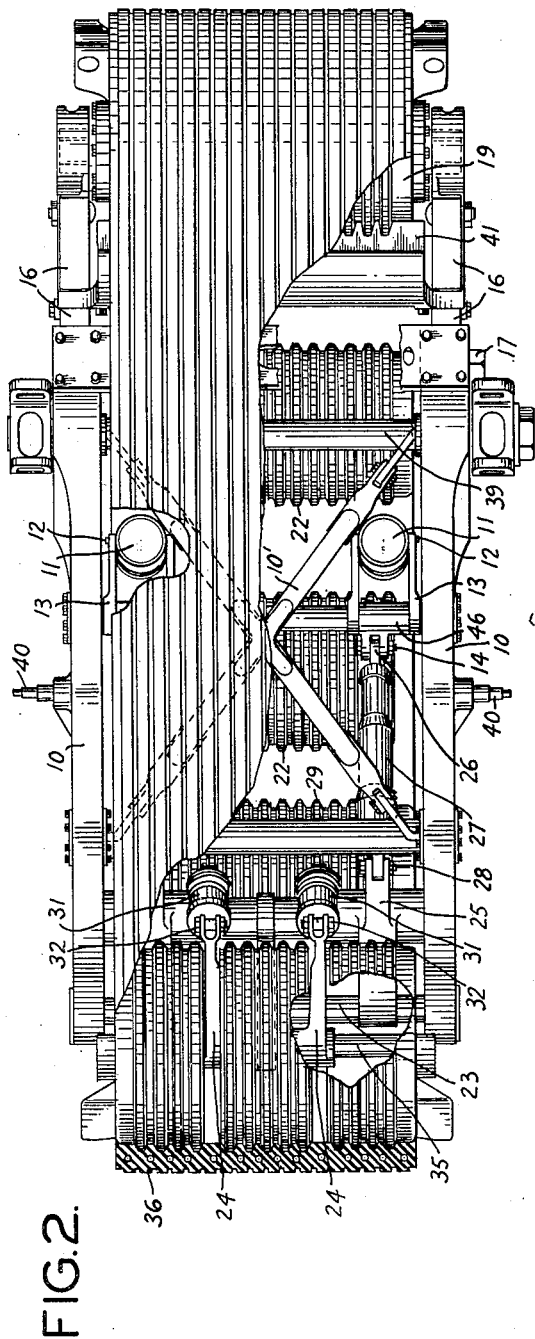

April 18, 1950 J. M. JACOBSON ET AL 2,504,128
AIRCRAFT LANDING GEAR
Filed July 8, 1948 4 Sheets-Sheet 2

INVENTORS

April 18, 1950   J. M. JACOBSON ET AL   2,504,128
AIRCRAFT LANDING GEAR
Filed July 8, 1948   4 Sheets-Sheet 3

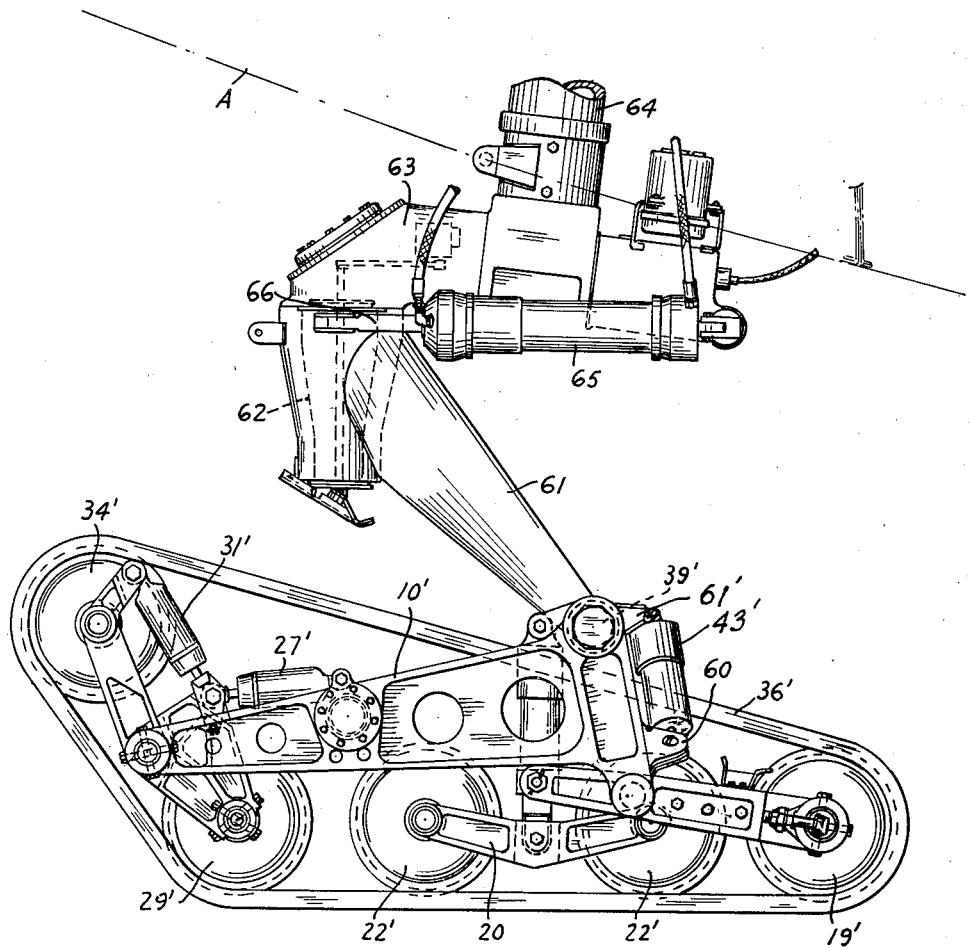

Patented Apr. 18, 1950

2,504,128

UNITED STATES PATENT OFFICE 2,504,128

AIRCRAFT LANDING GEAR

Joel M. Jacobson, Pikesville, and Stanley F. Brader and Hayden A. Fleck, Hagerstown, Md., assignors to Fairchild Engine and Airplane Corporation, a corporation of Maryland Application July 8, 1948, Serial No. 37,628

17 Claims. (Cl. 244—100)

This invention relates to aircraft landing gear, and has particular reference to the endless track type of landing gear for supporting and permitting landing on and take off from soft or uneven terrain.

A number of attempts have been made to perfect an endless track type landing gear for aircraft but few, if any, of the attempts have been successful for all practical purposes. Some designs have used a belt or track in which there was no tension load when there was no load on the gear itself, thus causing the track to sag, so that under certain conditions, such as side loading, the track runs off or is thrown from the rollers. An attempt was made to prevent this condition by using grooved rollers and a matching grooved track, but grooves alone will not always prevent the track from being thrown under certain conditions, especially when dirt or sand becomes lodged between the rollers and the track, or when an excessive twist occurs in the main frame due to travel over uneven ground. Another difficulty which has been experienced with former track type gears, and which is probably the most common and serious, is track failure due to overload, which can occur from several causes, such as in the application of sudden shock loads or in running over obstructions which cause the tension load in the track to exceed a safe limit. Attempts to correct this latter condition have been confined primarily to improving the design of the track, such as by using various compounds of rubber-impregnated fabric of various types, and to date the most successful appears to be a rubber compound track having steel cable reinforcement molded in the rubber, but whereas these expedients strengthen the track and allow a greater overload before it will fail, they have not solved the basic problem of mounting a safe range of track tensions under operating conditions. Another item conducive to track failure and instability of former track type landing gears is the tendency of the rear wheel or bogie to rise from the ground when brakes are applied.

In accordance with the present invention, an endless track type landing gear for aircraft is provided in which a track having a relatively large ground contact area travels over a plurality of bogies or wheels provided with means for determining and limiting the tension in the track to preclude overloading the track under any load applied externally during operation, all wheels or bogies being provided with shock absorbing means affording shock absorption substantially equal to that provided by a pneumatic tire for vertical loads applied when passing over objects or rough terrain, and improved braking is provided by the use of multiple brakes on the front and rear bogies with means to prevent or limit the tendency of any of the wheels or bogies to leave the ground during braking or other operating conditions, as well as means for automatically tightening the track during braking.

In a preferred embodiment of the invention, the endless track in the form of a belt passes over front and rear bogies or wheels, and a front idler fully elevated above the ground with a pair of load rollers intermediate the front and rear bogies. All wheels or bogies are pivoted or journalled on a main frame composed of side bolsters rigidly secured together, preferably by an X-beam truss. Specifically, the front wheel or bogie is journalled at each side on the end of a bell crank pivoted at its other end to the frame, with the approximate center of the bell crank connected by a hydraulic shock strut to the free end of another bell crank pivoted at its other end to the frame, preferably about the same pivot axis of the front bogie bell crank, the idler pulley being journalled at the center of the second bell crank. A second shock strut is connected between a third lever on the first bell crank and a point on the frame. With this arrangement, landing impact on the front bogie or wheel swings the first bell crank upwardly and rearward against the resistance of the first and second shock struts, thus tending to loosen the track, but this movement is transmitted through the first shock strut to the second bell crank which moves the idler further forward to take up track slackness and thus maintain it at proper tension. In this way the first bogie and idler linkages and their shock struts absorb initial shocks on landing and, when encountering an obstruction, preclude overload tension strains in the track, and prevent the belt from becoming slack by maintaining constant tension thereon, including the period after take off when the belt rotates at high speed.

The rear bogie is journalled at the rear end of a straight bar or lever pivoted at its center on the frame and carrying the spaced intermediate bogies or wheels at its other end, which is also connected by a main shock strut to the frame. With this arrangement the main shock strut resists the principal shock load through the rear bogie and the two intermediate wheels and also resists vertical loads, as when the two intermediate wheels roll over an obstruction, the tilt in either direction of the horizontal lever on which both intermediate wheels and the rear bogie are pivoted being resisted by the main shock strut.

The load is distributed among the load supporting bogies in such a way by the arrangement described that the downward reaction of the rear wheels or bogies is always positive so that they do not leave the ground under any operating conditions, including suddenly applied braking forces, and an eccentric mounting for the rear wheels is also preferably provided to automatically take up slack in the track belt when the brakes are applied.

It will be seen that the landing gear of the present invention enables larger and heavy aircraft to land upon and take off from unprepared and uneven terrain with substantially the facility of landing upon and taking off from a landing field, the gear accommodating the several difficulties of operations under those conditions that have been encountered in actual practice.

For a more complete understanding of the invention, reference may be had to the accompanying drawings, in which:

Figure 1 is a side elevation of the track gear this invention for use as the main landing gear for an aircraft;

Fig. 2 is a plan view thereof, with the track shown partly broken away to illustrate interior construction;

Fig. 7 is a side elevation of a nose gear for aircraft, similar in construction to the nose gear of Fig. 1, and embodying the invention.

Figure 3:
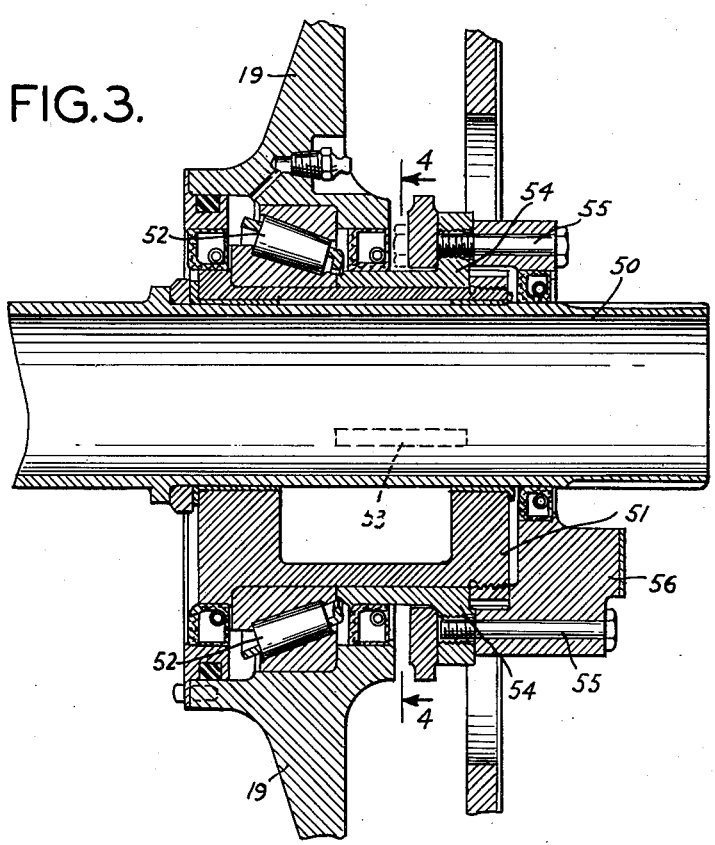
Fig. 3 is an enlarged fragmentary section through the eccentric mounting of the rear wheel which is used in tightening the track upon braking, as seen along the line 3—3 of Fig. 1.

As shown in Figs. 1 and 2, the main frame of the landing gear includes a pair of side channel frames or bolsters 10, connected by a cross-truss 10', and several cross-braces 17, 23, 39, 44, 46, extending between the side frames or bolsters 10 and performing other functions to be described. A central telescope shock absorbing unit 11 is pivotally mounted at point 12 to a link 13, which in turn is pivotally attached to cross-brace 46.

A rear wheel support lever 16 pivoted at 17 to frame 10 is pivotally attached at point 18 to the lower end of the shock strut 11. The opposite or rear end of the lever 16 carries the rear axle 50 on which is mounted the rear wheel 19. The lever 16 and the rear wheel 19 are prevented from moving downwardly beyond a predetermined point by stop 47 on side frame or bolster 10.

A lever 20 pivotally mounted at substantially its mid-point 21 to the shock strut 11 has a wheel or drum 22 mounted for rotation at each end. These two drums or wheels 22, 22 are of considerably less diameter than the rear wheel 19, as is clearly indicated in Figs. 1 and 2.

At the forward end of frame 10 is mounted a cross-shaft 23 near the outer ends of which are pivoted a pair of Y-shaped bell cranks 25, the pivot points of the latter being at the end of one of the arms thereof. Also pivoted on shaft 23 is a pair of substantially triangular-shaped bell cranks 24. Pivoted at point 26 to a fitting 14 bolted to brace 46 is a second shock strut 27 whose piston rod is pivotally connected at point 28 to the free end of one arm of the Y-shaped bell crank 25.

A wheel or drum 29, preferably of the same diameter as wheels or drums 22, is mounted for rotation at point 30 on the free end of the lower arm of bell crank 25. A third shock strut 31 is pivotally mounted at point 32 to the free end of one arm of bell crank 24 and its piston rod is pivotally connected to bracket 33 on the bell crank 25.

A forward wheel assembly 34, composed of three separate drums as shown in Fig. 2, is mounted for rotation on a common axle 35 at the forward corner or elbow of the bell crank 24. The track or ground contact element consists of a continuous belt 36 which encircles and is always in contact with the five wheels or drums 19, 22, 22, 29 and 34.

In order to install or remove the belt track 36, means are provided for loosening the belt from the wheels, and this means comprises an adjustable axle unit 37 for the rear wheel or drum 19. Loosening the bolt 48 allows the unit 37, including the rear wheel or drum 19, to move inwardly to loosen the track 36, and when bolt 38 is tightened, the distance between the point 17 and the center of the axle 50 is increased. Hence, this adjustment also allows the tension in the track 36 to be adjusted after being mounted on the wheels.

Figure 4:
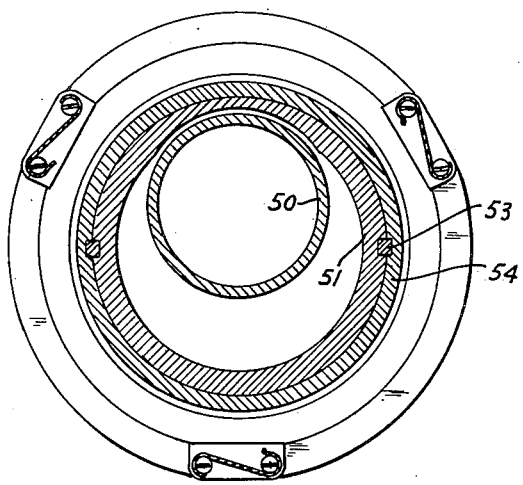
Fig. 4 is a transverse section therethrough as seen along the line 4—4 of Fig. 3.

As shown especially in Figs. 1, 3 and 4, an eccentric drum 51 is journalled on rear axle 50 and the rear wheel 19 is journalled on eccentric drum 51 by means of roller bearing 52. Mounted on the eccentric drum 51 and keyed thereto at 53 is a ring 54 which is bolted at 55 to rearward extensions 56 connected to the brake shoe 57 engaging the inner surface of rear wheel 19 and preferably applied at will by the operator by the conventional hydraulic or pneumatic means, not necessary to be illustrated and described. It will be observed upon inspection of Fig. 1, that whereas the brake shoe 57 is concentric with the axle 50, it is eccentric with respect to the eccentric drum 51 on which the rear wheel 19 is journalled, so that as the brake shoe 57 is applied, the center of wheel 19 tends to move around the braking center of axle 50, with the result that the eccentric 51 causes the wheel 19 to move rearwardly, thus automatically tightening the track 36. When the brake shoe 57 is released the drag on the wheel 19 by the track 36 causes the eccentric 51 to return the wheel 19 to its normal position, shown in Fig. 1. Brakes may also be installed on the front wheels 34, although rear wheel brakes suffice for most purposes.

As shown in Fig. 1, a suitable mud scraper 41 is preferably mounted just ahead of the rear wheel 19 to scrape any accumulation of mud or earth from the wheel and discharge it laterally from the track unit to keep it from lodging between the wheels and the track 36 to preclude dislodging the track 36.

The entire landing gear is attached to the main landing gear strut 42 of an aircraft at shaft 39. A shock absorbing strut 43 extending between the aircraft and point 40 serves the purpose of positioning the track unit at the proper angle for landing contact with the ground and for retraction, and it absorbs dynamic loads produced by wind gusts and the like, on the gear when the aircraft is flying.

The operation of the landing gear as shown in Fig. 1 may be considered by examining the load conditions in the static position there shown in which the bulk of the load is supported by the three wheels 22, 22 and 19, with the forward ground contact wheel 29 purposely arranged to support a very small percentage of the total load, on the order of ten per cent.

It will be evident that the main shock absorbing unit 11 resists the main shock load through the three rear wheels 22, 22, 19, and any upward load on the two center wheels 22, 22, such as that caused by the gear rolling over an obstruction, will be absorbed by the shock unit 11, even though the upper point 12 of attachment of the unit 11 is free to pivot on the shackle or link 13, since the unit 11 is restrained by the arm 16 to which it is connected at point 18. It will be observed that otherwise point 18 would have to move upwardly with the force, and the rear wheel would have to move downwardly, which it cannot do since it is resisted by the ground, and by the stop 47 on the side frame or bolster 10.

Vertical forces on the rear wheel are also resisted through the main shock unit 11, as occurs in rolling over an obstruction whereupon an upward load would be exerted on the rear wheel 19 which would cause the lever 16 to rotate about its pivot point 17 and point 18 would be forced downward, thus compressing the shock unit 11. It is thus clear why the shock strut 11 must be unrestrained relative to the main frame 10 and remaining structure.

The two forward wheels 29 and 34, together with their linkages and shock units 27 and 31, perform the three desirable functions of first absorbing initial shock when encountering an obstruction, second, preventing overload in the track 36, and third, preventing the track 36 from becoming slack by maintaining substantially constant tension therein.

When the landing element encounters an obstruction the forward ground wheel 29 tends to swing upward on the bell crank 25, which then pivots about point 23 and the shock is absorbed by the shock unit 31. Whereas, this upward movement would normally tend to cause slack in the track 36, the rotation of the bell crank 25 about its pivot 23 is resisted by the shock member 31 whose resultant force is transmitted through point 32 so that bell crank 24 is swung counter-clockwise about pivot 23 and the wheel 34 is moved forward to take up any slack that may occur in the track 36.

The track 36 is pre-tensioned a predetermined amount, which is in turn resisted by the shock units 31 and 27, but when the track is rotating at high speed, such as immediately after the take off, centrifugal force tends to cause the unsupported upper length of the track 36 between the front wheel 34 and the rear wheel 19 to bow upwards, but this tendency is resisted by the shock units 31 and 27 which take up any slack in the track by urging the front wheel 34 forwardly and thus substantially precluding any bowing tendency of the track 36.

Figure 5:
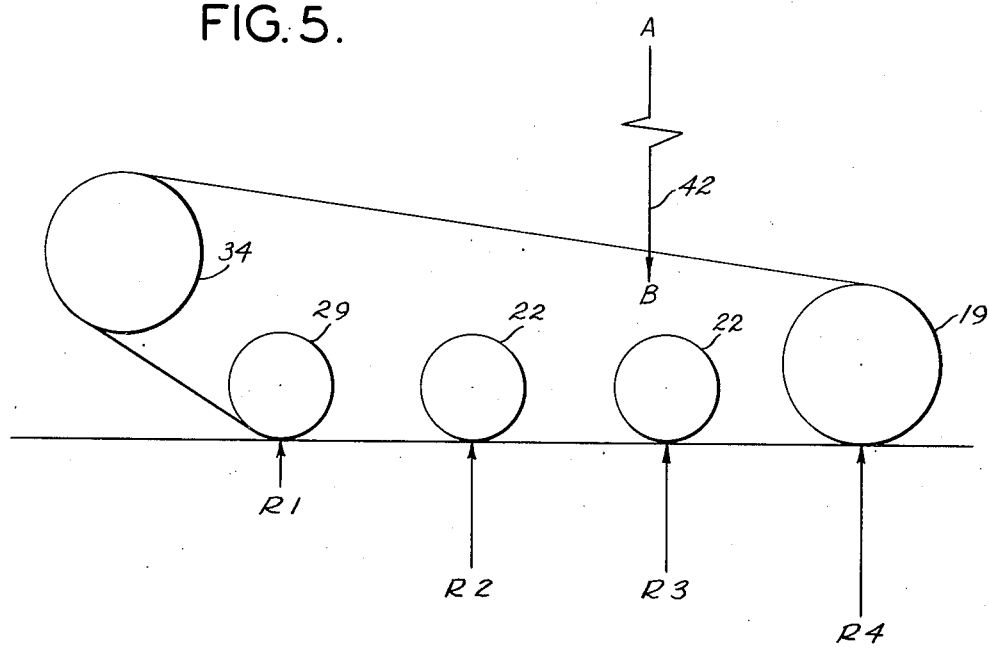
Fig. 5 is a force diagram for the gears of Figs. 1 and 7 under static loading conditions.

As previously stated, one of the requirements of a successful track gear is proper load distribution to prevent the rear wheel 19 from leaving the ground when the brakes 57 are applied. Such proper load distribution is illustrated by the force diagrams of Figs. 5 and 6. Referring to Fig. 5, indicating a static loading condition, the vector AB represents the entire static load on the unit applied by main strut 42, with the point load application indicated at B, R1, R3, and R4 representing the reaction loads. As previously stated and indicated in Fig. 5, the bulk of the load, approximately ninety per cent thereof, is distributed substantially equally over the three rear wheels 22, 22 and 19 with the forward ground wheel 29 purposely supporting a much smaller portion of the load, or approximately ten per cent.

Figure 6:
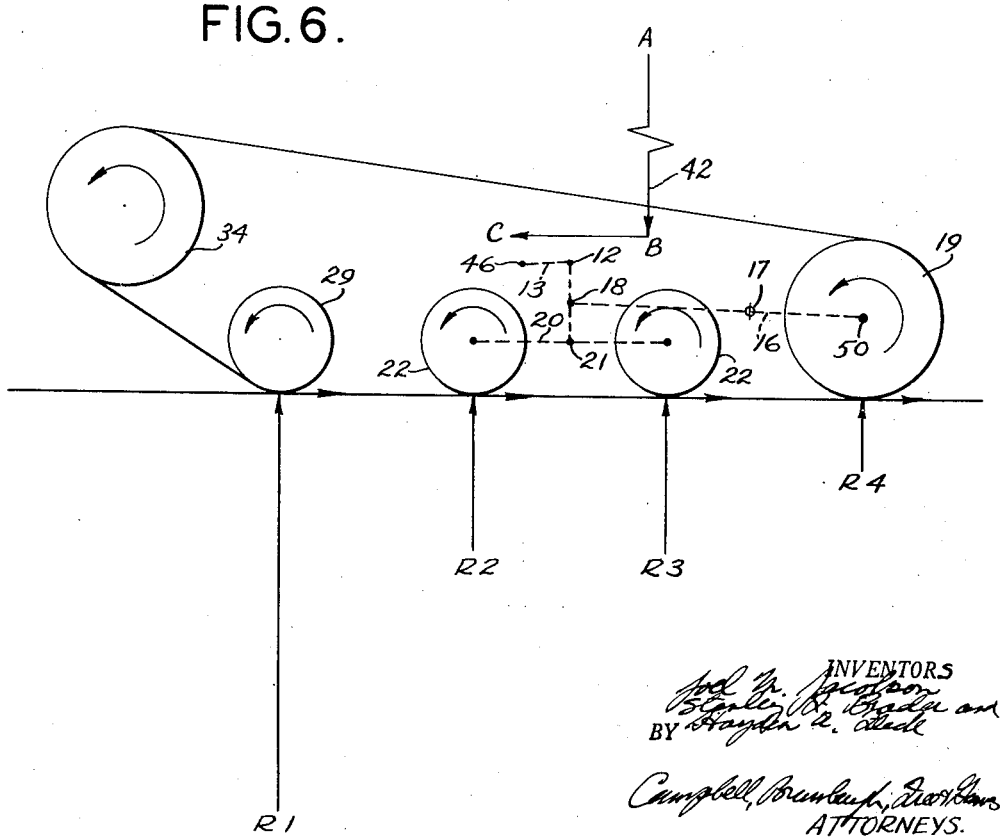
Fig. 6 is a force diagram for the gear in forward motion with brakes being applied.

One reason for this load distribution and division is illustrated by Fig. 6, which represents a force diagram for the gear when it is in motion over the ground with brakes 57 being applied. The force due to braking is represented by the vector CB which, together with the ground friction forces acting in the opposite direction thereto, form a couple which tends to rotate the entire unit in a counter-clockwise direction about point B. Under these conditions, the reaction R1 will be increased considerably while R2 and R3 will increase to a lesser degree, and although reaction R4 will decrease considerably, it will always be a positive force tending to keep the rear wheel in contact with the ground, one of the desirable functions of the gear of this invention. This is accomplished through proper load distribution by location of point B and the wheel spacing together with the linkage arrangement between the two center wheels 22 and the rear wheel 19.

Fig. 7 illustrates a modification of the gear of Fig. 1 adapted to use as the nose gear of a tricycle landing gear aircraft, and the primed reference characters designate the same or similar parts. The principal difference between the nose gear of Fig. 7 and the main gear is that the wheels are all the same size in the former, which is preferable but not necessary. Also, a fourth shock absorber 60 has been added to the main unit which replaces shock absorber 43 of the main gear of Fig. 1. The main purposes of this fourth shock unit 60 are to position the track gear for landing and for retraction and also to absorb dynamic loads, similar to the functions of the shock unit 43 shown in Fig. 1.

As is further shown in Fig. 7, the nose gear is carried on a strut 61, pivoted about vertical axle 62 on a yoke 63 mounted on a supporting tube 64 carried by the aircraft A. By means of an hydraulic or pneumatic cylinder carried by yoke 63 and operated from the cockpit steering links 66 will turn strut 61 and the gear about vertical axle 62 and thus steer the aircraft on the ground while taxiing, and the like.

Although a preferred embodiment of the invention has been illustrated and described herein, it is to be understood that the invention is not limited thereby, but is susceptible of changes in form and detail within the scope of the appended claims.

I claim:

1. In aircraft landing gear of the endless belt track type, the combination of a frame, a lever pivoted at one end at the front of said frame, a ground wheel journalled at the other end of said lever and engaged by said track, a second lever pivoted at one end at the front of said frame, an idler wheel journalled at the other end of said second lever and engaged by said track, a rear wheel carried by said frame and engaged by said track, and shock absorbing means interposed between said levers normally holding them in relatively fixed relative angular position, whereby upward retracting movement of said front ground engaging wheels urges said idler wheel forwardly through said shock absorbing means to thereby maintain tension in said track.

2. In aircraft landing gear of the endless belt track type, the combination of a frame, a bell crank lever pivoted at one end at the front of said frame, a ground wheel journalled at the other end of said lever and engaged by said track, a second bell crank lever pivoted at one end at the front of said frame, an idler wheel journalled intermediate the ends of said second lever and engaged by said track, a rear wheel carried by said frame and engaged by said track, and shock absorbing means interposed between an intermediate point on said first lever and the other end of said second lever normally holding them in relatively fixed relative angular position, whereby upward retracting movement of said front ground engaging wheel urges said idler wheel forwardly through said shock absorbing means to thereby maintain tension in said track.

3. In air craft landing gear of the endless belt track type, the combination of a frame, a lever pivoted at one end at the front of said frame, a ground wheel journalled at the other end of said lever and engaged by said track, shock absorbing means interposed between said lever and said frame, a second lever pivoted at one end at the front of said frame, an idler wheel journalled at the other end of said second lever and engaged by said track, a rear wheel carried by said frame and engaged by said track, and second shock absorbing means interposed between said levers normally holding them in relatively fixed relative angular position, whereby upward retracting movement of said front ground engaging wheel urges said idler wheel forwardly through said shock absorbing means to thereby maintain tension in said track.

4. In aircraft landing gear of the endless belt track type, the combination of a frame, a bell crank lever pivoted at one end at the front of said frame, a ground wheel journalled at the other end of said lever and engaged by said track, shock absorbing means interposed between said lever and said frame, a second bell crank lever pivoted at one end at the front of said frame, an idler wheel journalled intermediate the ends of said second lever and engaged by said track, a rear wheel carried by said frame and engaged by said track, and second shock absorbing means interposed between an intermediate point on said first lever and the other end of said second lever normally holding them in relatively fixed relative angular position, whereby upward retracting movement of said front ground engaging wheel urges said idler wheel forwardly through said shock absorbing means to thereby maintain tension in said track.

5. In aircraft landing gear of the endless belt track type, the combination of a frame, a lever pivoted at one end at the front of said frame, a ground wheel journalled at the other end of said lever and engaged by said track, a second lever pivoted at one end at the front of said frame, an idler wheel journalled at the other end of said second lever and engaged by said track, a substantially horizontal lever pivoted intermediate its ends at the rear of said frame, a rear wheel journalled at the rear end of said horizontal lever and engaging said track, an intermediate ground wheel carried at the forward end of said horizontal lever and engaging said track, and shock absorbing means interposed between said horizontal lever and said intermediate wheel.

6. In aircraft landing gear of the endless belt track type, the combination of a frame, a lever pivoted at one end at the front of said frame, a ground wheel journalled at the other end of said lever and engaged by said track, a second lever pivoted at one end at the front of said frame, an idler wheel journalled at the other end of said second lever and engaged by said track, a substantially horizontal lever pivoted intermediate its ends at the rear of said frame, a rear wheel journalled at the rear end of said horizontal lever and engaging said track, an intermediate ground wheel carried at the forward end of said horizontal lever and engaging said track, and substantially vertical shock absorbing means interposed between one end of said horizontal lever and said intermediate wheel for resisting substantially vertical movement of said intermediate ground wheel.

7. In aircraft landing gear of the endless belt track type, the combination of a frame, a lever pivoted at one end at the front of said frame, a ground wheel journalled at the other end of said lever and engaged by said track, a second lever pivoted at one end at the front of said frame, an idler wheel journalled at the other end of said second lever and engaged by said track, a substantially horizontal lever pivoted intermediate its ends at the rear of said frame, a rear wheel journalled at the rear end of said horizontal lever and engaging said track, an intermediate ground wheel carried at the forward end of said horizontal lever and engaging said track, and substantially vertical shock absorbing means interposed between the forward end of said horizontal lever and said intermediate wheel for resisting upward movement of said intermediate ground wheel.

8. In aircraft landing gear of the endless belt track type, the combination of a frame, a lever pivoted at one end at the front of said frame, a ground wheel journalled at the other end of said lever and engaged by said track, a second lever pivoted at one end at the front of said frame, an idler wheel journalled at the other end of said second lever and engaged by said track, a substantially horizontal lever pivoted at the rear of said frame at a point intermediate the ends of said horizontal lever, a rear wheel journalled at the rear end of said horizontal lever and engaging said track, an intermediate ground wheel engaging said track, and shock absorbing means interposed between said intermediate wheel and said frame and connected to the forward end of said horizontal lever.

9. In an aircraft landing gear of the endless belt track type, the combination of a frame, a lever pivoted at one end at the front of said frame, a ground wheel journalled at the other end of said lever and engaged by said track, a second lever pivoted at one end at the front of said frame, an idler wheel journalled at the other end of said second lever and engaged by said track, a substantially horizontal lever pivoted intermediate its ends at the rear of said frame, a rear wheel journalled at the rear end of said horizontal lever, a second substantially horizontal lever, intermediate ground wheels journalled at the free ends of said second horizontal lever and engaging said track, and shock absorbing means interposed between a mid-point on said second horizontal lever and the forward end of said first horizontal lever for resisting upward movement of said intermediate wheels.

10. In aircraft landing gear of the endless belt track type, the combination of a frame, a lever pivoted at one end at the front of said frame, a ground wheel journalled at the other end of said lever and engaged by said track, a second lever pivoted at one end at the front of said frame, an idler wheel journalled at the other end of said second lever and engaged by said track, a substantially horizontal lever pivoted intermediate its ends at the rear of said frame, a rear wheel journalled at the rear end of said horizontal lever, a second substantially horizontal lever, intermediate ground wheels journalled at the free ends of said second horizontal lever and engaging said track, and shock absorbing means pivoted at one end to a mid-point on said second horizontal lever and at the other end to the forward end of said first horizontal lever for resisting upward movement of said intermediate wheels.

11. In aircraft landing gear of the endless belt track type, the combination of a frame, a lever pivoted at one end at the front of said frame, a ground wheel journalled at the other end of said lever and engaged by said track, a second lever pivoted at one end at the front of said frame, an idler wheel journalled at the other end of said second lever and engaged by said track, shock absorbing means interposed between said levers, a substantially horizontal lever pivoted intermediate its ends at the rear of said frame, a rear wheel journalled at the rear end of said horizontal lever and engaging said track, an intermediate ground wheel carried at the forward end of said horizontal lever and engaging said track, and second shock absorbing means interposed between said horizontal lever and said intermediate wheel.

12. In aircraft landing gear of the endless belt track type, the combination of a frame, a lever pivoted at one end at the front of said frame, a ground wheel journalled at the other end of said lever and engaged by said track, a second lever pivoted at one end at the front of said frame, an idler wheel journalled at the other end of said second lever and engaged by said track, shock absorbing means interposed between said levers, a substantially horizontal lever pivoted intermediate its ends at the rear of said frame, a rear wheel journalled at the rear end of said horizontal lever, a second substantially horizontal lever, intermediate ground wheels journalled at the free ends of said second horizontal lever and engaging said track, and second shock absorbing means interposed between a mid-point on said second horizontal lever and the forward end of said first horizontal lever for resisting upward movement of said intermediate wheels.

13. In aircraft landing gear of the endless belt track type, the combination of a frame, a lever pivoted at one end at the front of said frame, a ground wheel journalled at the other end of said lever and engaged by said track, a second lever pivoted at one end at the front of said frame, an idler wheel journalled at the other end of said second lever and engaged by said track, shock absorbing means interposed between said levers, second shock absorbing means interposed between said second lever and said frame, a substantially horizontal lever pivoted intermediate its ends at the rear of said frame, a rear wheel journalled at the rear end of said horizontal lever and engaging said track, an intermediate ground wheel carried at the forward end of said horizontal lever and engaging said track, and third shock absorbing means interposed between said horizontal lever and said intermediate wheel.

14. In aircraft landing gear of the endless belt track type, the combination of a frame, a lever pivoted at one end at the front of said frame, a ground wheel journalled at the other end of said lever and engaged by said track, a second lever pivoted at one end at the front of said frame, an idler wheel journalled at the other end of said second lever and engaged by said track, shock absorbing means interposed between said levers, second shock absorbing means interposed between said second lever and said frame, a substantially horizontal lever pivoted intermediate its ends at the rear of said frame, a rear wheel journalled at the rear end of said horizontal lever, a second substantially horizontal lever, intermediate ground wheels journalled at the free ends of said second horizontal lever and engaging said track, and third shock absorbing means interposed between a mid-point on said second horizontal lever and the forward end of said first horizontal lever for resisting upward movement of said intermediate wheels.

15. In aircraft landing gear of the endless belt track type, the combination of a frame, a front wheel carried by said frame and engaging said track, a rear axle mounted on said frame, an eccentric drum journalled on said axle, a rear wheel journalled on said eccentric drum and engaging said track, said rear wheel having a braking surface eccentric with respect to said rear axle and concentric with respect to said eccentric drum, and a brake concentric with and engaging said braking surface, whereby the drag created on said braking surface upon application of said brake causes said rear wheel to move eccentrically about said rear axle to thereby tighten the track belt.

16. In aircraft landing gear of the endless belt track type, the combination of a frame, a lever pivoted at one end at the front of said frame, a ground wheel journalled at the other end of said lever and engaged by said track, a second lever pivoted at one end at the front of said frame, an idler wheel journalled at the other end of said second lever and engaged by said track, a rear axle mounted on said frame, an eccentric drum journalled on said rear axle, a rear wheel journalled on said eccentric drum and engaged by said track, a brake for said rear wheel, and shock absorbing means interposed between said levers normally holding them in relatively fixed relative angular position, whereby upward retracting movement of said front ground engaging wheel urges said idler wheel forwardly through said shock absorbing means to thereby maintain tension in said track.

17. In aircraft landing gear of the endless belt track type, the combination of a frame, a lever pivoted at one end at the front of said frame, a ground wheel journalled at the other end of said lever and engaged by said track, a second lever pivoted at one end at the front of said frame, an idler wheel journalled at the other end of said second lever and engaged by said track, a substantially horizontal lever pivoted intermediate its ends at the rear of said frame, a rear axle mounted at the rear end of said horizontal lever, an eccentric drum journalled on said rear axle, a rear wheel journalled on said eccentric drum and engaging said track, a brake for said rear wheel, an intermediate ground wheel carried at the forward end of said horizontal lever and engaging said track, and shock absorbing means interposed between said horizontal lever and said intermediate wheel.

JOEL M. JACOBSON.
STANLEY F. BRADER.
HAYDEN A. FLECK.

REFERENCES CITED

The following references are of record in the file of this patent:

UNITED STATES PATENTS

| Number | Name | Date |
|---|---|---|
| 1,836,446 | Christie | Dec. 15, 1931 |
| 2,281,351 | Dowty | Apr. 28, 1942 |